United States Patent
Chieu et al.

(10) Patent No.: US 8,560,563 B2
(45) Date of Patent: Oct. 15, 2013

(54) APPARATUS AND METHOD OF SEMANTIC SERVICE CORRELATION SYSTEM

(75) Inventors: Trieu C. Chieu, Scarsdale, NY (US); Hui Lei, Scarsdale, NY (US); Guo Tong Xie, Beijing (CN); Liangzhao Zeng, Mohican Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 12/170,064

(22) Filed: Jul. 9, 2008

(65) Prior Publication Data

US 2010/0010974 A1    Jan. 14, 2010

(51) Int. Cl.
*G06F 17/00* (2006.01)
*G06N 5/00* (2006.01)

(52) U.S. Cl.
USPC .............................. 707/769; 706/45; 707/719

(58) Field of Classification Search
None
See application file for complete search history.

(56) References Cited

U.S. PATENT DOCUMENTS

| | | | |
|---|---|---|---|
| 5,692,106 A * | 11/1997 | Towers et al. | 706/45 |
| 6,640,231 B1 | 10/2003 | Andersen et al. | |
| 6,983,286 B1 * | 1/2006 | Sinha et al. | 707/719 |
| 2004/0143623 A1 * | 7/2004 | Fukui et al. | 709/200 |
| 2005/0033727 A1 * | 2/2005 | Abrams | 707/1 |
| 2005/0256819 A1 * | 11/2005 | Tibbs et al. | 706/46 |
| 2005/0289501 A1 | 12/2005 | Patton | |
| 2006/0031256 A1 * | 2/2006 | Bosworth et al. | 707/104.1 |
| 2006/0122983 A1 * | 6/2006 | King et al. | 707/3 |
| 2006/0233180 A1 * | 10/2006 | Serghi et al. | 370/401 |
| 2007/0201655 A1 * | 8/2007 | Shenfield | 379/201.01 |
| 2008/0010312 A1 * | 1/2008 | Gupta | 707/102 |
| 2008/0065656 A1 * | 3/2008 | Theeten et al. | 707/100 |
| 2008/0109481 A1 * | 5/2008 | Catanzariti et al. | 707/104.1 |
| 2008/0154870 A1 * | 6/2008 | Evermann et al. | 707/4 |

FOREIGN PATENT DOCUMENTS

WO    2005/005270    6/2005

OTHER PUBLICATIONS

David E. Baken; MiddleWare; 2003;Kluwer Academic Press; Encyclopedia of Distributed Computing; pp. 1-5.*
Mark Burstein A Semantic Web Services Architecture; 2005; University of South Carolina;pp. 1-12.*
Meditskos et al.; "A Rule-Based Object-Oriented OWL Reasoner"; IEEE Transactions on Knowledge and Data Engineering, vol. 20, No. 3, Mar. 2008, pp. 397-410.

* cited by examiner

*Primary Examiner* — Apu Mofiz
*Assistant Examiner* — Jermaine Mincey
(74) *Attorney, Agent, or Firm* — Whitham, Curtis, Christofferson & Cook, P.C.; William Stock

(57) ABSTRACT

A correlation-based service mediator consists of Semantic Query Generator, Service Query Manager, Service Invocation Flow Generator, Service Invocation Manager, Expression Interpreter and Service Invocation Result Cache. The Semantic Query Generator handles service requests. It generates Semantic Query statements. Basically, the generator converts service request to Semantic Query based on input/output parameters in the service request. The Service Query Manager interfaces with an Ontology Engine, in order to execute the semantic queries. It will pass the query results to Service Invocation Flow Generator. The Service Invocation Flow Generator creates service invocation flow definition based on query results passed from Service Query Manager. The Service Invocation Manager executes the flow definitions. It also manages a service invocation result cache, so that invocation results can be saved and reused for later service request. When the execution results are not available in cache, the Service Invocation Manager invokes service according to flow definition. It should be noted that when attribute dependent functions are invoked Expression Interpreter compute the execution results. The service mediator possesses two major functionalities: service matching and service invocation.

14 Claims, 5 Drawing Sheets

APPARATUS AND METHOD OF SEMANTIC SERVICE CORRELATION SYSTEM

BACKGROUND OF THE INVENTION

1. Field of the Invention

The present invention generally relates to service mediation for supporting interactions among services in heterogeneous and dynamic environments and, more particularly, to a semantic service mediation system that performs service correlation systematically as part of the service mediation, freeing programmers from understanding extraordinary details of service interfaces when enabling service composition.

2. Background Description

Service mediation is a very active area of research and development. As background to the invention, we first review some work in the area of service discovery (matching), and then look at some service composition prototypes.

Service discovery and matching is one of the cornerstones for service mediations. Current Web service infrastructures have limitations on providing flexibility to choose selection criteria along multiple dimensions. For instance, UDDI (Universal Description, Discovery and Integration) provides limited search facilities that allows only keyword-based searching of services. To overcome this limitation, semantic technology (as described, for example, in B. Benatallah, M.-S. Hacid, A. Leger, C. Rey, and F. Toumani., "On automating web services discovery", *The VLDB Journal*, 14(1): 84-96, 2005, and M. Paolucci, T. Kawamura, T. Payne, and K. Sycara. "Importing the Semantic Web in UDDI", *Proceedings of Eservices and the Semantic Web Workshop,* 2002) is used to support multiple dimension searching criterions for services. For example, in the paper by M. Paolucci et al., the service description capabilities within DAML-S are mapped into UDDI records, in which semantic descriptions are used to support service discovery and matching. In the paper by B. Benatallah et al. a flexible matchmaking among service descriptions and requests by adopting Description Logics (DLs). However, most of these semantic solutions focus on one-to-one matchings.

Typically, a service mediation system contains three roles: (1) service providers, who publish services; (2) service consumers, who request services, (3) service mediators, who are responsible for service repository management, service matching, service invocation and invocation result delivery. The early service mediations are keyword and value-based: (i) the service discovery is keyword-based (e.g., UDDI (Universal Description, Discovery and Integration)); (ii) service invocations are based on the value of exchanged messages, and the mediator does not perform any data transformations during which. For example, a service request is about retrieving a sports car's insurance quote, where the input parameter's type is SportsCar and output parameter's type is CarPremium. For the value-based service mediation, only the services that exactly match input parameter type SportsCar and output parameter type CarPremium can satify the request. In case the service request and service interfaces' input/output parameter types are not exactly matched, then the data format transformation needs to be provided by programmers.

Consequently, as an improvement to keyword and type-based solutions, semantics are introduced into service mediations, wherein ontologies enable richer semantics of service descriptions and more flexible matchings. See, for example, B. Benatallah et al., supra, and M. Paolucci, T. Kawmura, T. Payne, and K. Sycara, "Semantic Matching of Web Services Capabilities", *First International Semantic Web Conference,* 2002. However, in current semantic service mediation systems, the concept mapping (i.e., A "is a" B) is provided when the service requests and service interfaces are not exactly matched. However, it does not support the mapping that involves transformation functions (e.g., A=f(B)). Therefore, when composting services (as described, for example, in L. Zeng, B. Benatallah, H. Lei, A. Ngu, D. Flaxer, and H. Chang, "Flexible Composition of Enterprise Web Services", *Electronic Markets—The International Journal of Electronic Commerce and Business Media,* 2003, and L. Zeng. B. Benatallah, A. H. H. Ngu, M. Dumas, J. Kalagnanam, and H. Chang, "QoS-Aware Middleware for Web Services Composition", *IEEE Transactions on Software Engineering,* 30(5): 311-327, 2004), developers need to not only understand detail specifications of available service interfaces to create composition schemas, but also implement the data transformation functions.

SUMMARY OF THE INVENTION

According to the present invention, we present the design and implementation of a novel semantic service mediation system which supports not only one-to-one service matchings, but also multiple-to-one service correlations. With our correlation-based mediation, when either adopting knowledge-based or process-based service composition mechanisms, developers can now focus on high level business logic to develop composition services, without understanding extraordinary details of service interfaces. Further, the attribute dependence based correlations perform data transformations systematically, which frees developers from the implementations of data transformation functions.

In our service mediation, semantic information in service descriptions and requests enables one-to-multiple service matchings, which initiates a type of automatic service correlation. Our service correlation is different from the existing industrial and academic service composition frameworks (e.g., J. Koehler and B. Srivastava, "Web service composition: Current solutions and open problems", *ICAPS '03 Workshop on Planning for Web Services,* June 2003). The industrial solution typically does not provide explicit goals of the composition and does not describe the pre- and post-conditions of individual services. A service is viewed as a remote procedure call. A service composition is quite often specified as a process model (e.g., BPEL4WS (Business Process Execution Language for Web Services)) though a richer process specification is needed. Ultimately, a process language specification of a Web service composition should contain control-flow descriptions including branching and iteration/recursion for alternative composition execution, dataflow descriptions of the type hierarchy of process artifacts, exception handlers for increased reliability and fault-tolerance of the composition. The messages between the services are simple syntactic descriptions without any semantics specifications. The composition itself is mostly done manually by IT specialists in an ad-hoc manner. In our approach, a collection of services are correlated based on the semantics of service interfaces, without much programming efforts involved.

The semantic web approach, mostly used in the research community relies on the specification of semantics of operations, explicit specifications of goals of composition, pre- and post-conditions of the composed services in a common service ontology, and specification of conditions in temporal logic. A planning algorithm is often used to produce a composite service (see, for example, S. Narayanan and S. McIlraith, "Simulation, Verification and Automated Composition of Web Services", *Proceedings of the 11th International World Wide Web Conference*, Honolulu, USA, 2002, and M. Pistore, P. Traverso, and P. Bertoli, "Automated composition of web services by planning in asynchronous domains", *ICAPS '05*, 2005). Typically, an AI planning produces a composite service consisting of atomic actions without a hierarchy and contextual information. In our approach, instead of defining the service composition knowledge, the common ontology used in our solution is a general ontology, i.e., it focuses concepts and dependence among them only. Based on the input/output parameters of service interfaces, we compose microflows to correlation services, which is transparent to service compositions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In this section, we first introduce some important concepts in ontology, and then present the proposed system architecture of the semantic service mediation. Finally, we present the details of service correlation.

Ontology

In our system, we adopt an object-oriented approach to defining ontologies, in which the type is defined in terms of classes (See Definition 1 below) and an instance of a class is considered as an object (See Definition 2 below). In this subsection, we present a formal description of class and object. It should be noted that this ontology formulation can be easily implemented using OWL (a Web Ontology language). We will present details on how to use ontology to perform semantic matchings and correlation matchings in following sections.

Definition 1 (Class). A class C is defined as the tuple $C=<N, S, P, R, F>$, where N is the name of the class;

S is a set of synonyms for the name of class, $S=\{s_1, s_2, \ldots, s_n\}$;

P is a set of properties, $P=\{p_1, p_2, \ldots, p_2\}$. For $p_i \in P$, $p_i$ is a 2-tuple in form of $<T, N_p>$, where T is a basic type such as integer, or a class in an ontology, $N_p$ is the property name. $p_i$ ($p_1 \in P$) is the key property for identification;

R is a set of parent classes, $R=\{C_1, C_2, \ldots, C_k\}$;

F is a set of dependence functions for the properties, $F=\{f_1, f_2, \ldots, f_l\}$. Each function is in form of a collection of expressions $\{f_{j_1}, f_{j_2}, \ldots, f_{j_n}\}$, one for each non-key property, and a predicate c for the key property. And $f_{j_k}$ can be further denoted as $p_k=f_{j_k}(p_1', p_2', \ldots, p_m')$, where the $p_i'$ is property from a class other than C and the predicate c is used to correlate $p_i'$.

In the definition of class, the name, synonyms, and properties present the connotation of a class; while parent classes and dependence functions specify relationships among the classes, i.e., present the denotation of a class. A class may have parent classes for which it inherits attributes. For example, class sportsCar's parent class is Car. Therefore, the class sportsCar inherits all the attributes in class Car.

Other than inheritance relationships, different classes may have value dependence on their properties. In our framework, dependence functions are used to indicate the value dependence among the different classes. For example, we have three classes Duration, Arrival and Departure. In Duration, a dependence function consists of two expressions: {Duration.duration=minus(Arrival.timeStamp, Departure.timeStamp), Duration.unitOfDuration=minute}, where the predicate is Duration.shippingID=Arrival.shippingID=Departure.shippingID.

Figure 1:
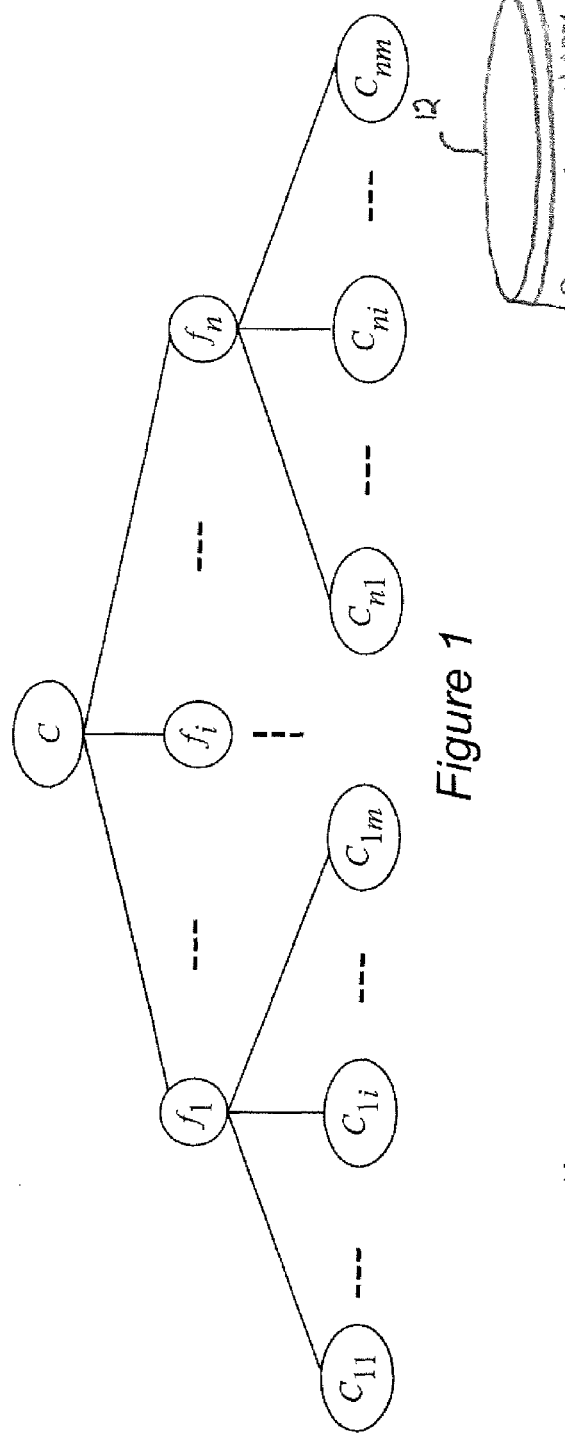
FIG. 1 is a diagram of a dependence tree of the class C.

Based on dependence functions, a dependence tree can be constructed for each class. Assuming that the class C has a set of dependence functions F, a dependence tree can be generated as in FIG. 1. There are three kinds of nodes in a dependence tree, namely class node, operator node and defendant class node. A class C's complete dependence set (denoted as $\Theta_c$) is defined as a collection of depended classes that can be used to calculate the value of the property. For example, the set $\{C_{11}, C_{12}, \ldots, C_{1m}\}$ in FIG. 1 is a complete dependence set.

Definition 2 (Object). An object o is a 2-tuple $<N_c, V>$, o is an instance of a class C, where $N_c$ is the class name of C;

$V=\{v_1, v_2, \ldots, v_n\}$, are values according to the attributes of the class C. For $v_i \in V$, $v_i$ is a 2-tuple in form of $<N_p, V_p>$, where $N_p$ is the property name, $V_p$ is the property value.

Service Interface and Service Request Description

A service interface is denoted as $I_s$ ($P_{in}$, $P_{out}$), where $P_{in}$ ($P_{in}=<C_1, C_2, \ldots, C_n>$) indicates input parameter classes, $P_{out}$ ($P_{out}=<C_1, C_2, \ldots, C_m>$) indicates output parameter classes. An example of a service s's interface can be $I_s$ ($P_{in}$<SportsCar>, $P_{out}$<CarInsurance, CarFinance>), which contains one input parameter and two output parameters.

A service request usually includes functional and non-functional requirements. In this paper, we focus on functional requirements only. A service request is denoted as $Q(O_{in}, E_{out})$, where $O_{in}$ ($O_{in}=<o_1, o_2, \ldots, o_n>$) indicates input objects, $E_{out}$ ($E_{out}=<C_1, C_2, \ldots, C_m>$) indicates expected output parameters from the services. An example of a service request can be Q ($O_{in}$<car>, $E_{out}$<CarInsurance, CarFinance>), which contains one input object car and expects a service provides two outputs: CarInsurance and CarFinance.

TABLE 1

Examples

| Entity | Example |
|---|---|
| service request | $Q_1(O_{in}(\text{sportsCarA}), E_{out}(\text{CarInsurance, CarFinance}))$ |
| candidate service's interface | $I_n(P_{in}(\text{Car}), P_{out}(\text{CarInsurance, CarFinance}))$ |
| interface set | $\Gamma_k = \{I_1, I_2\}$, where $I_1$ $(P_{in}(\text{Car}), P_{out}(\text{CarInsurance}))$, $I_2$ $(P_{in}(\text{Car}), P_{out}(\text{CarFinance}))$ |
| interface set | $\Gamma_f = \{I_1, I_2, I_3, I_4\}$, where $I_1(P_{in}(\text{SportsCar}), P_{out}(\text{Licence})), I_2(P_{in} (\text{Licence}), P_{out}(\text{CarOwner}))$. $I_3(P_{in} (\text{CarOwner}), P_{out}(\text{CarInsurance})), I_4(P_{in}(\text{SportsCar}), P_{out}(\text{CarFinance}))$. |
| service request | $Q_2(O_{in} (\text{shippingPkgA}), E_{out}(\text{Duration.}))$ |
| interface set | $\Gamma_a = \{I_1, I_2\}$, where $I_1$ $(P_{in}(\text{ShippingPkg}), P_{out}(\text{Departure}))$, $I_2$ $(P_{in}(\text{ShippingPkg}), P_{out}(\text{Arrival}))$ |

Correlation-Based Service Matching

In our framework, a collection of service interfaces be correlated to one that can provide all the necessary outputs required by a service request. Correlation can be either based on common fields and/or attribute dependence functions. For example, two service interfaces $I_1$ and $I_2$ in $\Gamma_k$ (see Table 1 above) can be correlated as they both have the field Car as the input parameter. a key-based correlation service interface set, i.e., The formal definition of a key-based correlation interface set is shown as follows.

In the following each subsection, a various definitions of service interface sets are discussed, wherein the service interface that can be correlated under different conditions.

Parameter-Based Correlation

Obviously, multiple service interfaces can be correlated if they share some input parameters and have different output parameters. Here, we start with the most rigid correlation, where a set of service interfaces that are correlatable by a key input parameter that is specified by the service request.

Definition 3 (Key-based Correlation Interface Set $\Gamma_{kc}$). $\Gamma = \{I_1, I_2, \ldots, I_n\}$, where $I_i$ is a of service interfaces. $\Gamma$ is a Key-based Correlation Service Interface Set of Q iff:
  1. Q can semantically provide all inputs for $\Gamma$;
  2. Service interfaces in $\Gamma$ can semantically provide all the outputs expected by Q;
  3. Service interfaces in $\Gamma$ are correlatable for key object $o_k$;
  4. Any service interfaces in $\Gamma$ contributes a unique output expected by Q.

In this definition, both condition 1 and 2 are necessary conditions, while condition 3 and 4 are the sufficient conditions. Using the above example, the aggregation of $I_1$ and $I_2$ provides all the required outputs for the service request, which satisfy condition 1; and their input can be provided by the service request, which satisfies condition 2. Both interfaces have the input parameter Car that is the ancestor of SportsCar—the key class in service request Q. Therefore, the condition 3 is satisfied. Also, $I_1$, (resp. $I_2$) provides unique output CarInsurance (resp. CarFinance), which satisfies condition 4. Therefore, $I_1$ and $I_2$ compose a key-based correlation service interface set for the service request.

It should be noted that the condition 1 in Definition 3 assumes that there is not any dataflow among the services in the set. We can have a more general definition on the key-based correlation interface set if dataflows are allowed, wherein dataflows indicate that the some interfaces in the set need to be invoked in a sequence. By introducing dataflow, the condition 1 is refined as:

For any input required by the service interfaces in F either
  is provided by Q or
  is provided by outputs of a service interface $I_i$ in $\Gamma$.

If the input is appeared in input parameters of interface $I_j$, then interface $I_j$ is invoked after $I_i$ and does not need to provide any inputs for interface $I_i$ and any other interfaces that invoked before $I_i$. Actually, by further releasing the constraint that correlating is based on input key field only, more generic correlations can be defined. For example, the correlation can be based on any input objects. In such a generic correlation, we adopt the notion of Correlatable Class (see Definition 4). In this definition, two classes are correlatable in a set of interfaces if either they appear in the same interface's inputs, or when these two classes do not appear in the same service interface (belong to two interfaces $I_x$ and $I_y$ respectively), either (i) $I_x$ provides at lease one input parameter for $I_y$ (other input parameters can be provided by the service request) or vice versa; or (ii) $I_x$ and $I_y$ share some input parameters, or (iii) there is a sequence of interfaces in the set that are correlatable "step by step" and aiming for correlating $I_x$ and $I_y$ in the end. Actually, if we consider $I_x$ and $I_y$ are entities in ER model, then these services between $I_x$ and $I_y$ in the sequence are relationships: in order to join two entities without common attributes, a collection of relationships $[I_{x+1}, I_{x+2}, \ldots, I_{y-1}]$ are required. For example, class SportsCar and CarInsurance are correlatable in $I_f$ (see Table 2), as class SportsCar and CarInsurance appear in $I_1$ and $I_3$ respectively; and $I_2$ is considered as a relationship to bridge SportsCar and CarInsurance.

Definition 4 (Correlatable Class). Class $C_i$, $C_j$ are correlatable in an interface set $\Gamma$ ($\Gamma = \{I_1, I_2, \ldots, I_n\}$), iff either $C_i$ and $C_j$ appear in same service interface; or $C_i$ and $C_j$ do not appear in a service interface, then $\exists I_x, I_y \in \Gamma$, $x \neq y$, $C_i$ (resp $C_j$) is output class of $I_x$ (resp. $I_y$) and either:

$I_y$ can provide some input for $I_x$; or $I_x$ can provide some input for $I_y$; or $I_x$ and $I_y$ have some comment input; or there is an interface sequence $[I_x, I_{x+1}, I_{x+2}, \ldots I_{y-1}, I_y]$ in $\Gamma$, for any $I_i$, $I_{i+1}$ in the sequence, $I_i$'s outputs provide some inputs for $I_{i+1}$, and for each $I_i$ in the sequence, input parameters can be provided either by the $I_x, I_{x+1}, \ldots, I_{i-1}$, or the service request.

Based upon the notion of correlatable class, we can define the concept of Parameter-based Correlation interface Set (see Definition 5 below). Different from key-based correlation, this definition allows correlations on any fields.

Definition 5 (Parameter-based Correlation Interface Set $\Gamma_{pc}$). $\Gamma = \{I_1, I_2, \ldots, I_n\}$, $I_i$ is a service interface, $\Gamma$ is a Parameter-based Correlation Interface Set of service request Q if:
  1. Q can semantically provide all inputs for $\Gamma$;
  2. Service interfaces in $\Gamma$ can semantically provide all the outputs expected by Q;

3. Any outputs in service interfaces in Γ are correlatable;
4. ∀I$_i$ϵΓ, at lease one of the following is true:
   contributes at least one unique output expected by the service request;
   appears in interface sequences in condition 3 of this definition if some outputs are correlated by interface sequences.

Attribute-Dependence Correlation

Other than parameter-based, multiple interfaces can be correlated using dependence functions. Such cases happen when some required output parameters can not be provided by any available interfaces. Assuming that an absent parameter's class $C_i$ has a dependence function, the service mediator can compute the value of the absent output parameter using the attribute-dependence function. For example, if the class type Duration is required by the service request but is not provided by any services, as Duration's dependence set is {Departure, Arrival}, the system can search services that have output Departure or/and Arrival and correlate these output and compute the value for Duration. By generalizing this example, we can propose the definition of Key-based Attribute-dependence Correlation Interface Set (See Definition 6 below). Again, we first limited the correlation on key field only, wherein can be defined as:

Definition 6 (Key-based Attribute-dependence Correlation Interface Set $Γ_{ka}$). Γ={I$_1$, I$_2$, . . . , I$_n$}, I$_i$ is a service interface. Γ is a Key-based Attribute-dependence Correlation Service Set of the service request Q iff:
1. Q can semantically provide all inputs for Γ;
2. For any outputs expected by the service request, either
   a service interface I$_i$ can provide a semantic compatible output; or
   outputs of service interfaces contain a complete dependence set $Θ_c$, for the output required by the service request.
3. Service interfaces in Γ are correlatable for key object $o_k$;
4. Any service interfaces in Γ contributes a unique output expected by Q or Θ.

In condition 2 of the above definition, unlike the definition of parameter-based correlation interface set, a parameter required by the service request may not appear in any services. However, it can be computed using dependence functions (See Definition 2 above). Like parameter-based correlation interface set, the condition 3 concerns whether interfaces can be correlated by the key field. An example of key-based attribute-dependence correlation service set is $Γ_a$, for the service request Q$_2$. In the example, the request output Duration is not directly provided by any interfaces. Instead, two interfaces I$_1$ and I$_2$ provide outputs Departure and Arrival respectively, and Duration is then computed based on them.

Again, we can release the constraint that correlations are based on a key-field only. Therefore, the more generic Attribute-dependence Correlation Interface Set can be defined (see Definition 7 below). In particular, the condition 3 of the definition indicates that correlation can be done based on any fields.

Definition 7 (Attribute-dependence Correlation Interface Set $Γ_{ac}$). Γ={I$_1$, I$_2$, . . . , I$_n$}, I$_i$ is a service interface. F is a Attribute-dependence Correlation Interface Set of service request Q iff:
1. Q can semantically provide all inputs for Γ;
2. For any outputs expected by the service request, either
   a service interface I$_i$ can provide a semantic compatible output; or
   outputs of service interfaces contain a complete dependence set $Θ_{c_i}$ for the output required by the service request.
3. Any outputs in service interfaces in Γ are correlatable;
4. Any service interfaces in Γ contributes a unique output expected by Q or Θ.

Figure 2:
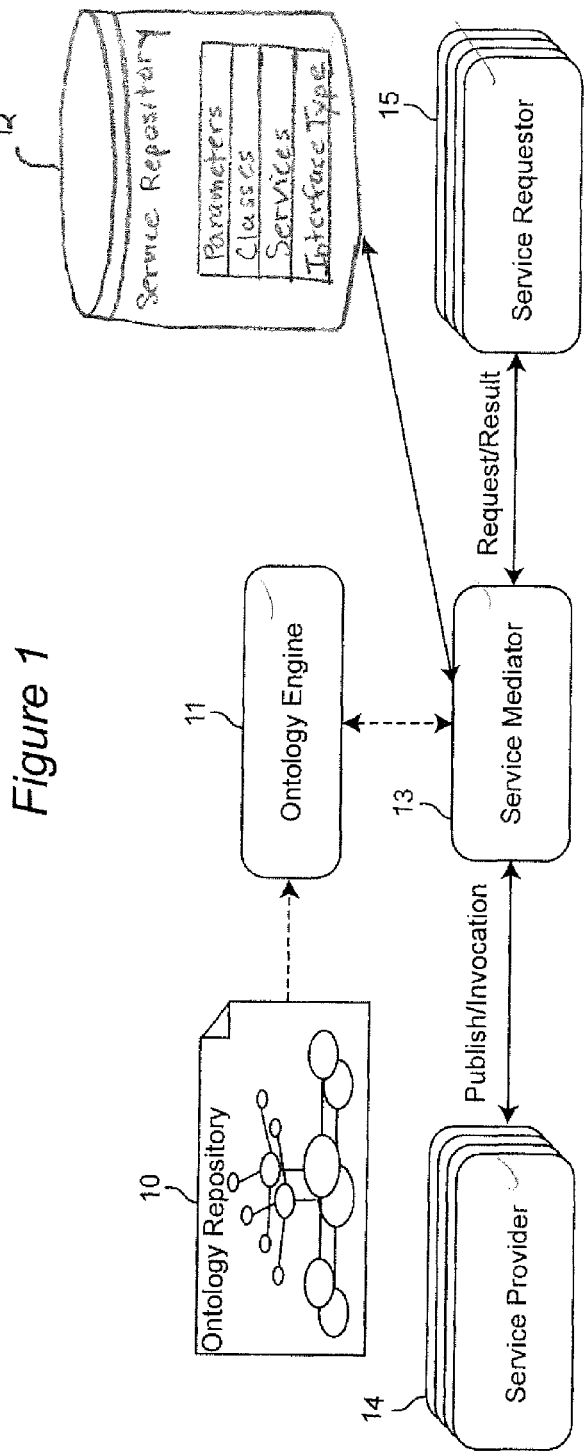
FIG. 2 is a block diagram illustrating the major components of the semantic service mediation system according to the invention.

As shown in FIG. 2, our semantic service mediation consists of three main components: ontology repositories 10, an ontology engine 11 and a service mediator 13. The ontology engine 11 accesses the ontology repositories 10 and communicates with the service mediator 13. The service mediator 13 accesses the service repository 12 and responds to service requests from service requestor 15 and invokes service providers 14 who publish services, as will be described in more detail below.

Ontology Representation

Most of the object-oriented ontology notations (see Definition 1 and 2) can map to OWL DL constructs (See Table 2), except for dependence function. Basically, dependence functions describe relationship among classes. Expressing such relationship requires OWL FULL instead of OWL DL, if we use only one OWL ontology to represent one object-oriented ontology. However, OWL FULL ontology is proven to be undecidable. In order to comply with OWL DL, two OWL ontologies are used. $O_n$ is used to present the ontology without dependence functions, while $O_d$ (See FIG. 1) represents dependence function among classes in $O_n$. Representation of dependence function in OWL is given in Table 3. In our setting, the annotation properties, rdf: seeAlso, is used to link $O_d$ and $O_n$.

TABLE 2

Map Object-Oriented Notation to OWL

| Object-Oriented Ontology | OWL DL Construct |
|---|---|
| Class C | owl:Class |
| Class name N | rdf:about |
| Synonyms S | owl:equivalentClass, e.g. <C, owl:equivalentClass, S1> |
| Properties P | owl:DatatypeProperty (rdfs:range is primitive type), or owl:ObjectProperty (rdfs:range is a class in OWL ontology) |
| Subclass R | rdts:subClassOf, e.g.<C, rdfs:subClassOf, C1> |
| Object o | owl:Individual |
| Value V | RDF triple, e.g. <i, p, e>. the value ot property p of individual i is v. |

For example, Duration.duration=minus (Arrival.timeStamp, Departure.timeStamp) is a dependence function, and Duration is the DefinedClass. This dependence function has two DependenceClass, Arrival and Departure. It has one DependenceExpression, where operator is minus and DefinedProperty is Duration.duration. The DependenceExpression has two DependenceProperty, Arrival.timeStamp and Departure.timeStamp. The mapping between dependence function in OWL and its Object-Oriented representation could be found at Table 3.

It should be noted that OWL ontologies in this invention are developed and visualized by using EODM RSA Workbench in IBM Integrated Ontology Development Toolkit (IODT).

TABLE 3

Representation of Dependence Function in OWL

| Object-Oriented Ontology | Dependence Function in OWL |
|---|---|
| Dependence function f$_i$ | DependenceFunction |
| Expression f$_{i_k}$ | DependenceExpression |

TABLE 3-continued

Representation of Dependence Function in OWL

| Object-Oriented Ontology | Dependence Function in OWL |
|---|---|
| Expression output $p_k$ | DefinedProperty |
| Expression operand $p'_i$ | DependenceProperty |
| Target class | DefinedClass |
| Source class | DependenceClass |
| Predicate c | DependenceFunction.predicate |

TABLE 4

Query Services

| Basic Query Services | SPARQL Query |
|---|---|
| getSubClass (C):<br>get all children classes of class C | PREFIX sme: <http://service.ibm/example#><br>SELECT ?c<br>WHERE {?c rdfs:subClassOf sme:C} |
| getEqClass (C):<br>get all synonym of class C,<br>including reasoning of owl:equivalentClass | PREFIX sme: <http://service.ibm/example#><br>SELECT ?c<br>WHERE {?c owl:equivalentClass sme:C} |
| getDirectDependeceSet (C):<br>get direct dependence set of class C | PREFIX sme: <http://service.ibm/example#><br>PREFIX ds: <http://service.ibm/dependence#><br>SELECT ?c<br>WHERE {sme:C rdf:seeAlso ?x . ?x ds:hasFunction ?f . ?f ds:hasClass ?c} |
| getDependenceFunction (C):<br>get dependence function of class C | PREFIX sme: <http://service.ibm/example#><br>PREFIX ds: <http://service.ibm/dependence#><br>SELECT ?f<br>WHERE {sme:C rdf:seeAlso ?x . ?x ds:hasFunction ?f} |

Ontology Query Service

With the above OWL presentations, we can use OWL ontology repository to provide ontology query services, wherein two OWL constructs rdfs:subClassOf and owl:equivalentClass in $O_n$ trigger OWL reasoning and produce inferred facts. In our implementation, most of the OWL ontology repositories are doing reasoning at loading time and all the inferred results are stored in the repository as well. After loading two ontologies, $O_n$ and $O_d$, a set of ontology query services are defined to retrieve combined ontology information by issuing SPARQL queries (Query Language for RDF, a directed, labeled graph data format for representing information in the Web). Basically, the ontology query services can be categorized into two categories, namely basic query service and dependence query service. The basic query services are providing methods to retrieve basic ontology information like class, property and individual. They can be achieved by querying $O_n$ only. The dependence query services must be implemented by issuing combined query over $O_n$ and $O_d$, to provide access to dependence set and dependence functions of a specific class. Some basic query services and associated SPARQL queries are given in table 4. In particular, getDirectDependenceSet (C) can only retrieve direct dependence set of class C. An algorithm to retrieve the complete collection of dependence sets of class C could be easily implemented by using the Breadth-First Traversal algorithm to traverse the instance graph of $O_d$.

Service Repository

Figure 3:
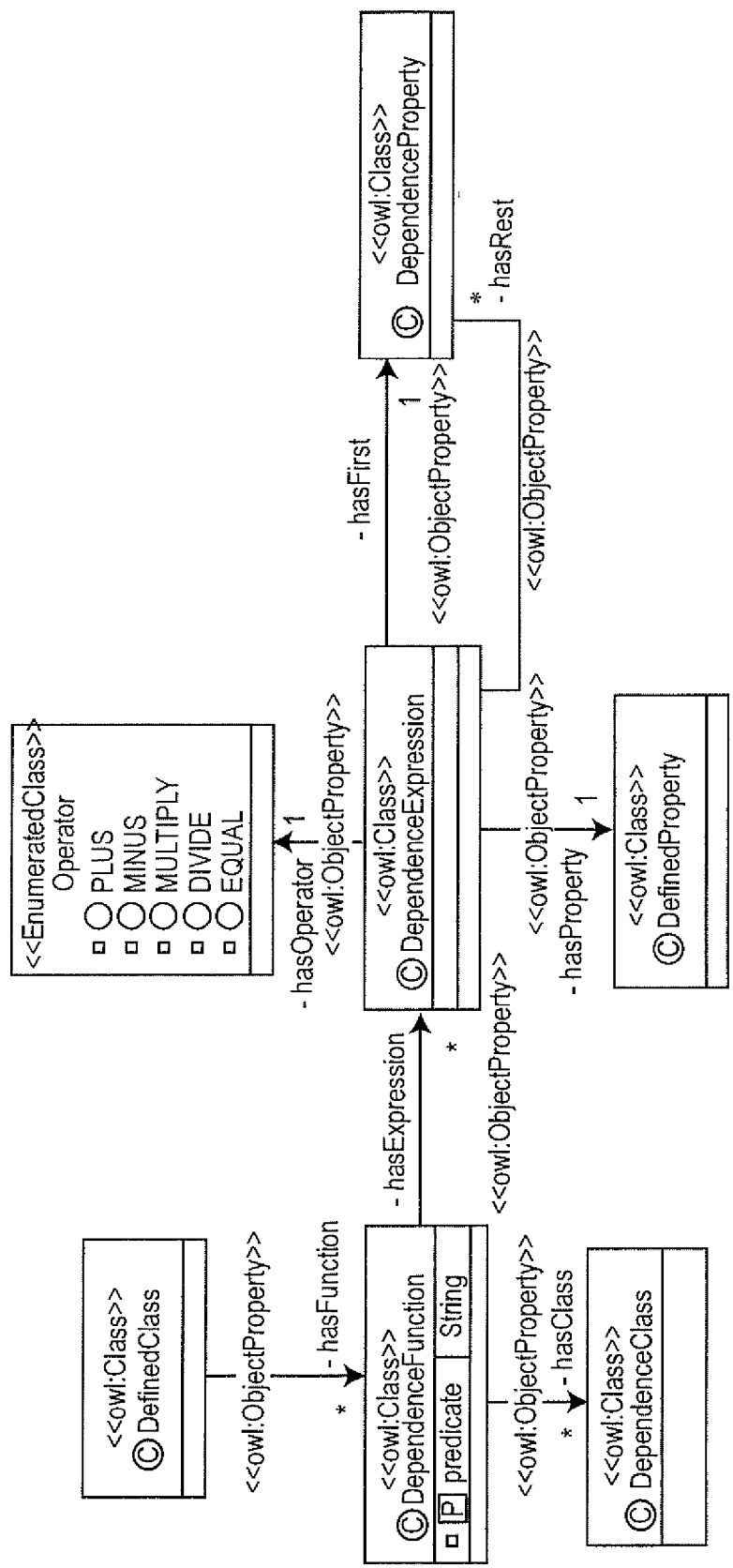
FIG. 3 is a block diagram illustrating the OWL ontology definition for dependence function.
Figure 4:
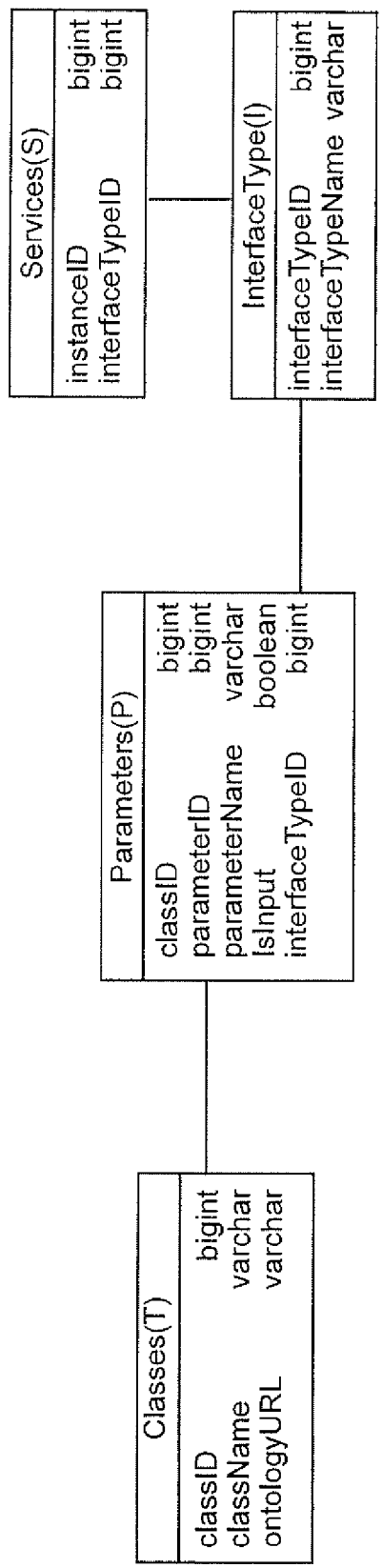
FIG. 4 is a simplified ER block diagram of the service repository.

We adopt a type-instance approach to organize the service repository: the service interface's input/output parameters are used to identify types of interfaces, while the information (in service publication) such as invocation, QoS, etc., are used to identify instances of service interfaces. In our solution, the service repository separates the data type information and contents of service interface (see FIG. 3 for simplified data schema), wherein one table Classes (T for short) is used to store the class type information for parameters in service interface, and another table Parameters (P for short) is used to store the parameter information of interface types. It should be noted that both class information and the content of the input/outputs are stored vertically in these tables. In particular, for table Classes, each class used in a service interface occupies a row. For each type of interface, a unique interfaceTypeID is assigned in table interfaceTypes (I for short). For each interface instance, a unique interfaceInstanceID is assigned in table interfaceInstance (S for short) and associated with interface type using the field interfaceTypeID. It should be noted that for the sake of presentation, we do not present the details of service description other than the service interface signature.

Service Mediator

Figure 5:
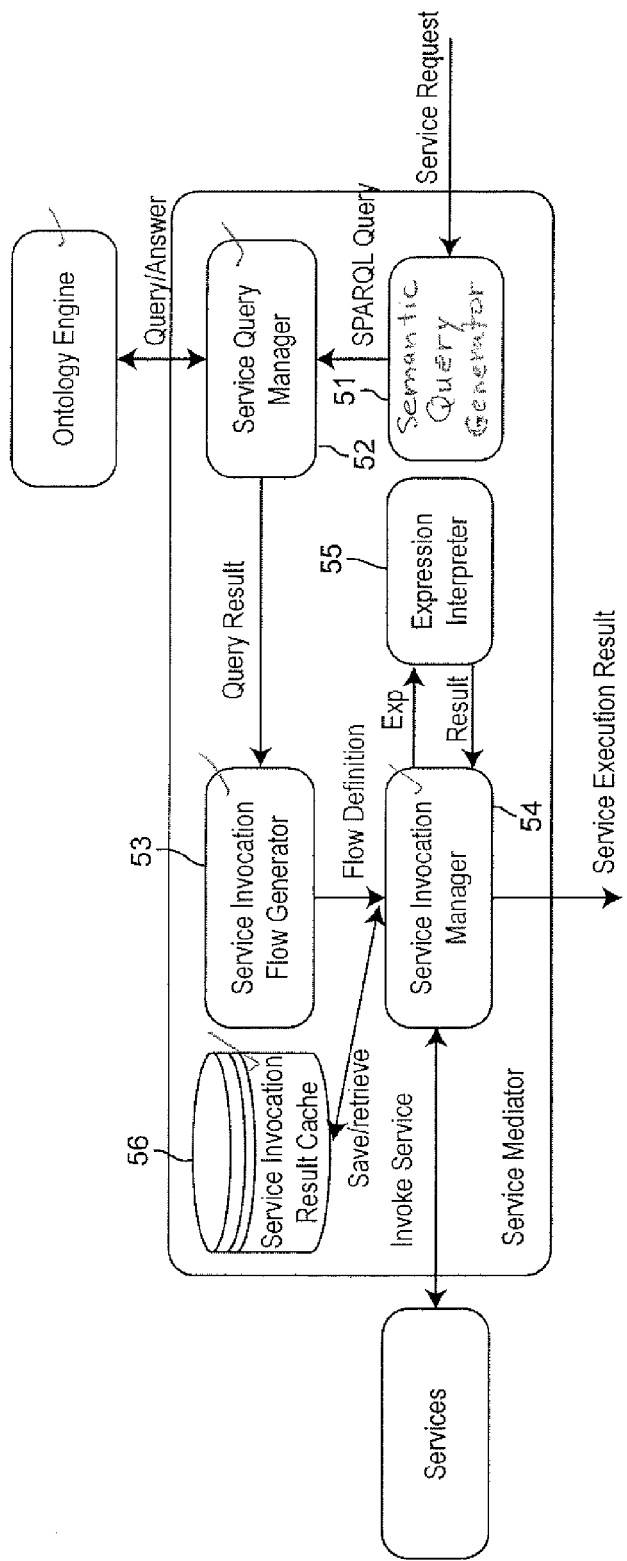
FIG. 5 is the service mediator system architecture block diagram according to the present invention.

The service mediator 13 is shown in FIG. 5 and consists of Semantic Query Generator 51, Service Query Manager 52, Service Invocation Flow Generator 53, Service Invocation Manager 54, Expression Interpreter 55 and Service Invocation Result Cache 56.

Semantic Query Generator 51 handles service requests. It generates Semantic (e.g., SPARQL) Query statements, wherein the detail algorithm can be found in the Ontology Query Service Section. Basically, the generator converts service request to Semantic Query based on input/output parameters in the service request.

Service Query Manager 52 interfaces with Ontology Engine 11, in order to execute the Semantic Queries. It will pass the query results to Service Invocation Flow Generator 53.

Service Invocation Flow Generator 53 creates service invocation flow definition based on query results passed from Service Query Manager 52. The details about flow generation are discussed below in Section on Service Invocation.

Service Invocation Manager 54 executes the flow definitions. It also manages a service invocation result cache 56, so that invocation results can be saved and reused for later service requests. When the execution results are not available in cache, the Service Invocation Manager 54 invokes service according to flow definition. It should be noted that when attribute dependent functions are invoked, the Expression Interpreter 55 computes the execution results. The service mediator 13 possesses two major functionalities: service matching and service invocation.

Service Matching

We discuss generation of queries for searching for a single service that can match a service request first. Basically, there are two steps involved: (i) generating queries to search all the service interface types that contain all the semantic compatibility output parameters for the service request; (ii) generating queries to inspect whether the service interface can be invoked using the inputs provided by the service request. In the first step, assuming the service request is $Q(O_{in}, E_{out})$ m (m is the number of expected outputs) queries are generated to search interface types that provide semantically compatible output parameters in $E_{out}$:

$$\rho(f_i \cdot \sigma_{T \cdot className=getSubClassC_i className) \land T \cdot isInput=false} T \bowtie classID\ P) \cdot i \in [1 \dots m] \quad (1)$$

Because the parameter information is stored vertically, equijoining $f_i$ on interfaceTypeID is required, in order to verify whether the interface type can provide all the compatible parameters required by the service request.

$$\rho(f_{out} \bowtie_{interfaceTypeID} \{f_i, i \in [1 \dots m]\}) \quad (2)$$

Now, $f_{out}$ presents the all the interface types that can provide all the necessary output parameters for the service request. The next step is to determine whether the services can be invoked by the inputs provided by the service request Q in $O_{in}$.

$$\rho(f \cdot \sigma_{(minus(\pi_{interfaceTypeID}f_{out}, C_{Oin})=\emptyset)}f_{out}) \quad (3)$$

In the query, $\Omega_{Oin}$ is set of classes that contains all the input objects in the service request, and the function minus (Set $\Omega_1$, Set $\Omega_2$) finds out all the classes in $\Omega_1$ that can not find semantic compatible class in $\Omega_2$. Therefore, if minus ($\pi_{f_{out}interfaceID}$, $\Omega_{Oin}$) returns null, it indicates that all the required inputs can be provided by the service request.

Now we discuss how to generate queries to search key-based correlation interface sets. Assuming that in the service request Q, the key's class type is $C_k$, two queries are generated for each output parameter class $C_i$:

$$\rho(f_k \cdot (\sigma_{C_k \cdot className=className \land T \cdot isInput=true} T \bowtie classID\ P)) \quad (4)$$

$$\rho(f_i \cdot (\sigma_{C_i \cdot className \in getSubClass(className) \land T \cdot isInput=false} T \bowtie classID\ P)) \quad (5)$$

where query $f_k$ searches service interface types that use $C_k$ as an input parameter and query $f_i$ searches service interface that contribute an output parameter $C_i$. For example, in Q, the key field's class is SportsCar. For the output parameter CarInsurance, two queries are generated as:

$$\rho(f_k \cdot (\sigma_{T \cdot className='SportsCar' \land T \cdot isInput=true} T \bowtie_{parameterID} P)) \quad (6)$$

$$\rho(f_i \sigma_{C_i \cdot className='CarInsurance' \land T \cdot isInput=false} T \bowtie_{parameterID} P) \quad (7)$$

By equijoining $f_k$ and $f_i$ on interfaceTypeID, we have $f_{k,i}$ (see query 8) that represents interface types that contain both key parameter $C_k$ as input and $C_i$ as output, in which the interface types satisfy the condition (2) and (3) in Definition 3.

$$\rho(f_{k,i}; f_k \bowtie_{interfaceTypeID} f_i) \quad (8)$$

Using the above example, $\rho(f_{k,1}; f_k \bowtie_{interfaceTypeID} f_1$ is generated for searching service interface types that contain both SportsCar as input parameter and the output parameter that is semantically compatible with field CarInsurance. Now, we discuss generating queries to search interface type that can satisfy the condition (1) in Definition 3.

$$\rho(f'_{k,i}; \sigma_{(minus(\pi_{interfaceTypeID}f_{k,i}, \Omega_{Oin})=\emptyset)}f_{k,i}) \quad (9)$$

By joining all the $f'_{k,i}$, we have the query $f'_{k,1}f'_{k,2} \dots f'_{k,m}$ that gives all possible key-based correlation interface set. In case any $f'_{k,i}$ returns null, which indicates the expected output parameter $C_i$ is missed. In such case, the service mediator can search attribute-dependence correlation set. Assumes that $\Theta_{c_i}$ ($\Theta_{c_i}=\{C_1, C_2, \dots C_l\}$) is complete dependence set for class $C_i$. If we consider each class in $\Theta_{c_i}$ expected output parameter class, same queries as (8) can be generated as an output parameter.

Service Invocation

Once a correlation interface set is identified, the service mediator constructs a microflow (represented as statechart) to compose services as a "virtual service" for the service requestor. Based on the input/output dependence, correlation relationship and attribute-dependence functions, there are three basic patterns in generating microflows.

Figure 7:
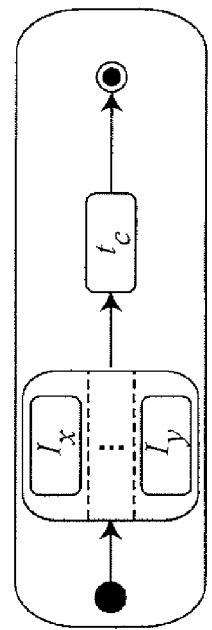
FIG. 7 is an illustration of the split-and-correlation microflow.
Figure 6:
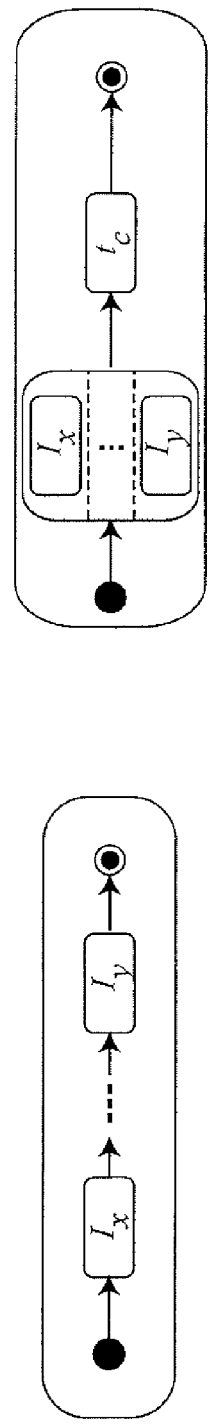
FIG. 6 is an illustration of the sequence microflow.
Figure 8:
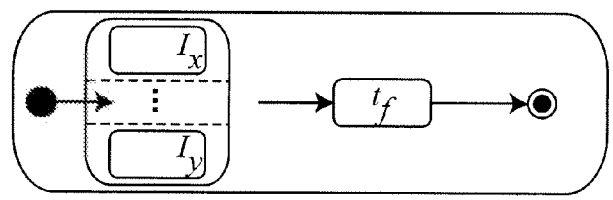
FIG. 8 is an illustration of the spilt-and-computation microflow.

1. Sequence. In this case (see FIG. 6), interfaces in a sequence $[I_x, I_{x+1}, \dots, I_y]$ have input/output dependence. In particular, for any $I_i$ in the sequence, it expects some outputs from some interfaces in $[I_x, I_{x+a}, \dots, I_{i-1}]$, while it does not provide any input for the interface in $[I_{i+1}, \dots, I_y]$.
2. Split-and-Correlation. In this case (see FIG. 7), interfaces in a set $\{I_x, I_{x+1}, \dots, I_y\}$ do not have any input/output dependence and the execution results need to be correlated and transformed to the format required by the service request. Therefore, in the microflow, these interfaces are invoked in paralleled and then a correlation task $t_c$ is performed.
3. Split-and-Computation. In this case (see FIG. 8), like previous case, interfaces in a set $\{I_x, I_{x+1}, \dots, I_y\}$ do not have any input/output dependence. Different from the previous case, these interfaces' outputs consist of a complete dependence set for a missing output parameter that is required by the service request. Therefore, after these interfaces are invoked in parallel, a computation task $t_f$ is then performed by the service mediator to compute the value of the missing output.

It should be noted that any $I_i$ in the above three patterns may not be an interface provided by the service provider, it can be provided from a "virtual service" composed by a microflow pattern.

Figure 9:
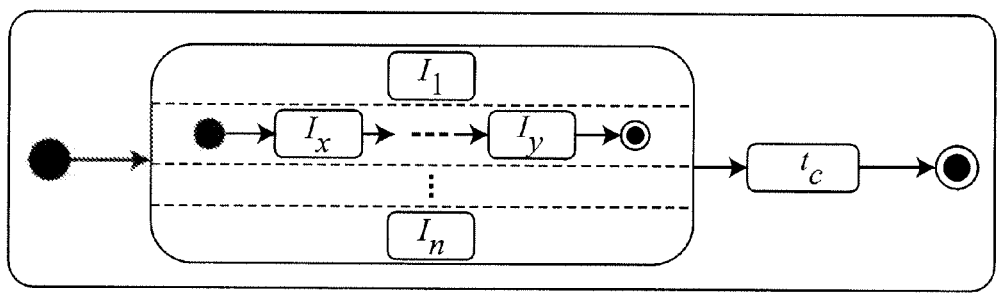
FIG. 9 is an illustration of the microflow for refined key-based correlation.

Now we discuss how to use the above three patterns to generate microflows for correlation interface sets. For the key-based correlation interface set (see Definition 3), the microflow is generated using split-and-correlation (see FIG. 7), as all the interfaces in the set do not have any input/ouput dependence. For the refined key-based correlation interface set that allows input/output dataflow among the interfaces, the microflow is generated using two constructs: sequence and split-and-correlation. An example of microflow for refined key-based correlation service set is shown in FIG. 9. It should be noted that, some interfaces in the set have input/output dependence. Assuming these interfaces compose a sequence $[I_x, I_{x+1}, \dots, I_y]$ (multiple sequences may created), they need to be invoked in order.

Figure 10:
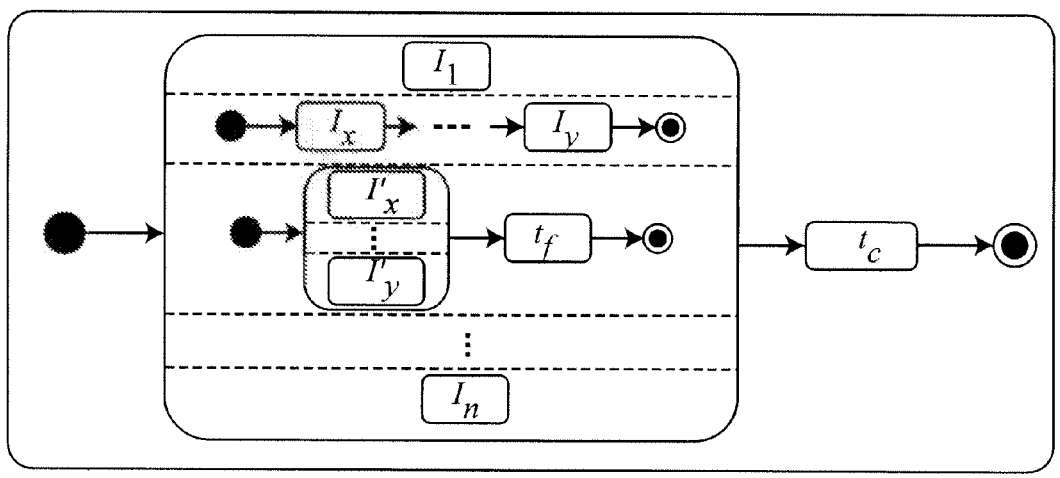
FIG. 10 is an illustration for the microflow of attribute-dependence correlation.

For the attribute-dependence correlation interface set (see Definition 7), all three patterns are applied to generate related microflows. An example microflow for attribute-dependence correlation is shown in FIG. 10. In the example, interfaces in the sequence $[I_x, I_{x+1}, \dots, I_y]$ that are the elements in the set that are used to correlate parameters that are not appeared in the same interface. While interfaces in set $\{I'_x, I'_{x+1}, \dots, I'_y\}$ provide complete dependence set for a missing output they do not have any input/output dependence.

In case multiple interface sets are identified for a service request, then multiple microflows are generated. In such cases, a quality-driven approach is adopted to select the best quality microflow for the service request. Once the microflow is generated, the service mediator orchestrates the execution of the services based on the control-flow and dataflow. Further, the service mediator possesses a computation engine for executing the attribute-dependence functions defined in the ontology. We implemented the computation engine on top of a XPath 2.0 expression engine.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of service correlation, comprising the steps, performed by a computer in a semantic service mediation system, of:
    publishing service interface descriptions into a service repository, wherein the service interface descriptions include input/output parameters, and wherein the service repository consists of four tables which include a table for Classes, a table for Parameters, a table for Services and a table for Interface Type, and wherein dependence functions specify relationships among the classes and indicate value dependence among different classes;
    translating service requests to semantic queries, and using semantic information in service descriptions and requests, performing one-to-multiple service matchings;
    executing semantic queries to locate candidate service providers for the service requests;
    identifying correlation interface sets based on key-based correlation, parameter-based correlation, key-based attribute-dependence based correlation, and attribute-dependence based correlation among the candidate service providers; wherein
        service interfaces in key-based correlation service interface sets are correlatable for a key object,
        service interfaces in parameter-based correlation interface sets are correlatable for any common input parameters,
        service interfaces in key-based attribute-dependence correlation service sets are correlatable for the key object, and
        service interfaces in attribute-dependence correlation interface sets are correlatable for any common input parameters;
    generating microflows from the correlation interface sets; and
    executing microflows to invoke services to satisfy the service requests.

2. The computer implemented method of claim 1, wherein the key-based correlation further comprises the step of configuring said computer to locate service interface sets that satisfy the following criteria:
    inputs for all service interfaces in a set are provided by input from a service request;
    service interfaces in a set provide all the outputs expected by the service request;
    service interfaces are correlatable for the key object; and
    any individual service interface in a set contributes a unique output expected by the service request.

3. The computer implemented method of claim 1, wherein the parameter-based correlation further comprises the step of configuring said computer to locate service interface sets that satisfy the following criteria:
    inputs for all service interfaces in a set are provided by input from a service request;
    service interfaces in a set provide all the output expected by the service request;
    any outputs in the service interfaces in a set are correlatable; and
    any individual service interface in a set contributes a unique output expected by the service request.

4. The computer implemented method of claim 1, wherein the key-based attribute-dependence correlation further comprises the step of configuring the computer to locate service interface sets that satisfy the following criteria:
    inputs for all service interfaces in a set are provided by a service request;
    for any outputs expected by the service request, either a service interface in a set provides a semantic compatible output; or outputs of the service interfaces in a set contain a complete dependence set for output required by the service request;
    any outputs in the service interfaces in a set are correlatable; and
    any individual service interface in a set contributes a unique output expected by the service request or the complete dependence set.

5. The computer implemented method of claim 1, wherein the attribute-dependence correlation further comprises the step of configuring the computer to locate service interface sets that satisfy the criteria:
    inputs for all service interfaces in a set are provided by a service request;
    for any outputs expected by the service request, either a service interface in a set provides a semantic compatible output; or outputs of service interfaces in a set contain a complete dependence set for the output required by the service request;
    any outputs in the service interfaces of a set are correlatable; and
    any individual service interface in a set contributes a unique output expected by the service request or the complete dependence set.

6. The method of claim 1, further comprising the steps, performed by the computer, of
    saving and reusing service invocation results for later service requests; and
    invoking service according to flow definitions when a service invocation result is not saved and available for reuse.

7. The method of claim 1, comprising supporting interactions among services in heterogeneous and dynamic environments.

8. The method of claim 1, performed in a service mediation system that contains three roles comprising
    (1) services providers, who publish services;
    (2) service consumers, who request services; and
    (3) service mediators, who are responsible for service repository management, service matching, service invocation and invocation result delivery.

9. The method of claim 1, comprising supporting one-to-one service matchings and supporting multiple-to-one service correlations.

10. The method of claim 1, comprising correlating a collection of services based on semantics of service interfaces, without much programming efforts involved.

11. The method of claim 1, comprising identifying multiple interface sets for a service request, followed by generating multiple microflows, followed by selecting a best quality microflow for the service request using a quality-driven approach.

12. The method of claim 11, comprising a step, once a best quality microflow has been generated, orchestrating execution of the services based on control-flow and dataflow, wherein the orchestrating step is performed by a service mediator.

13. The method of claim 12, wherein the orchestrating step is performed by a service mediator that comprises a computation engine that executes the attribute-dependence functions defined in the ontology.

14. The method of claim 12, wherein the computation engine is implemented on top of a XPath 2.0 expression engine.

* * * * *